J. D. Payne,
Riding Saddle,
Nº 483,     Patented Nov. 25, 1837.
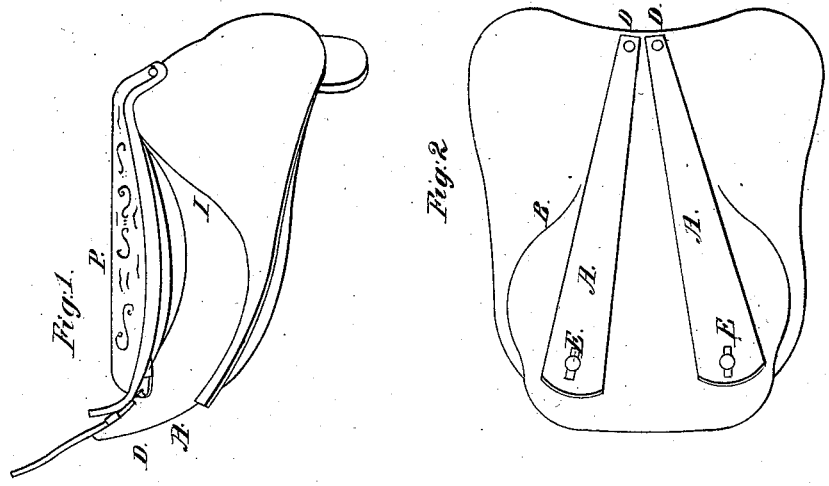

UNITED STATES PATENT OFFICE.

JOHN D. PAYNE, OF WARM SPRINGS, VIRGINIA.

IMPROVEMENT IN SPRING-SADDLES.

Specification forming part of Letters Patent No. 483, dated November 25, 1837.

*To all whom it may concern:*

Be it known that I, JOHN D. PAYNE, of Bath county, State of Virginia, have invented a new and useful Improvement in Saddles, which is described as follows, reference being had to the annexed drawings of the same, making part of this specification.

This improvement consists in arranging two curved tapered flat steel springs, A A, Figure 2, over the seat of the common saddle, B, placed side by side and fastened by screws D D, passing through the smaller ends into the pommel of the saddle, the wider ends resting upon the cantle, having slots or oblong mortises in said wider ends, which move over the shanks of screws E E, inserted into the cantle to keep said springs in their proper places, the middle of said springs being raised above the seat of the common saddle, and the whole covered with a neat padding, P, Fig. 1, for the seat. The broad ends of the springs are curved upward, so as to fit and lie flat on the cantle.

As these springs are contracted and extended from the motion of the horse and rider, the larger ends of the said springs have a longitudinal movement over the cantle, while the smaller ends are stationary on the pommel, the center having a vertical movement over the seat.

In the use of these springs any kind of saddle—new or old, gentlemen's or ladies'—can be fitted with said springs with the utmost facility and at the most trifling expense, producing a saddle delightfully easy and comfortable to the rider.

The invention claimed by me, the said JOHN D. PAYNE, and which I desire to secure by Letters Patent, consists in—

The before-described arrangement of curved flat tapered springs extending from the pommel to the cantle of the saddle above the ordinary seat, fastened permanently by the smaller ends to the pommel, the larger ends moving loosely over the cantle, said springs being covered with a padding, forming a second seat above the covered seat of the common saddle.

JOHN D. PAYNE.

Witnesses:
 WM. P. ELLIOT,
 W. BISHOP.